(12) United States Patent
Mialtu et al.

(10) Patent No.: US 9,638,548 B2
(45) Date of Patent: May 2, 2017

(54) OUTPUT SWITCHING SYSTEMS AND METHODS FOR MAGNETIC FIELD SENSORS

(75) Inventors: Razvan-Catalin Mialtu, Pitesti (RO); Dan-Ioan-Dumitru Stoica, Bucharest (RO); Heinz Untersteiner, Viktring (AT); Catalina-Petruta Juglan, Botosani (RO)

(73) Assignee: Infineon Technologies AG, Neubiberg (DE)

( * ) Notice: Subject to any disclaimer, the term of this patent is extended or adjusted under 35 U.S.C. 154(b) by 40 days.

(21) Appl. No.: 13/532,152

(22) Filed: Jun. 25, 2012

(65) Prior Publication Data

US 2013/0293221 A1    Nov. 7, 2013

Related U.S. Application Data

(60) Provisional application No. 61/643,677, filed on May 7, 2012.

(51) Int. Cl.
 *G01D 5/14* (2006.01)
(52) U.S. Cl.
 CPC ................................. *G01D 5/147* (2013.01)
(58) Field of Classification Search
 CPC .. G01B 7/30; G01B 7/003; G01B 7/14; G01L 3/105; G01D 5/147; G01D 5/12;
 (Continued)

(56) References Cited

U.S. PATENT DOCUMENTS

| 4,575,677 A | 3/1986 | Dennis |
| 4,914,387 A | 4/1990 | Santos |

(Continued)

FOREIGN PATENT DOCUMENTS

| CN | 101802632 A | 8/2010 |
| CN | 102052967 A | 5/2011 |

(Continued)

OTHER PUBLICATIONS

Allegro, *Dynamic Self-Calibrating, Peak-Detecting Differential Hall Effect Gear Tooth Sensor IC: ATS612LSG Datasheet*, © 2001 2003, 16 pages.

(Continued)

*Primary Examiner* — Son Le
*Assistant Examiner* — Brent J Andrews
(74) *Attorney, Agent, or Firm* — Schiff Hardin LLP

(57) ABSTRACT

Embodiments relate to predictive output switching threshold determination systems and methods for sensors, for example magnetic field sensors. In embodiments, at least one individual switching threshold is determined predictively, rather than reactively, for each tooth or pole of a ferromagnetic tooth or pole wheel, respectively. For example, in one embodiment, the number of teeth or poles is programmed, and an optimal threshold for each tooth or pole is determined during a rotation of the wheel. The determined optimal threshold for each tooth is then used for that tooth in at least one subsequent rotation of the wheel, with calibration optionally taking place in future subsequent rotations. Thus, in embodiments, thresholds are predictive for each individual tooth or pole rather than reactive to an adjacent tooth or pole.

33 Claims, 8 Drawing Sheets

(58) Field of Classification Search
CPC ...... G01D 5/2448; G01D 5/145; G01P 21/02; G01P 3/489; G01P 3/488; G01P 3/487; G01R 25/005

USPC .......................................... 324/207.2, 207.25

See application file for complete search history.

(56) References Cited

U.S. PATENT DOCUMENTS

| | | | |
|---|---|---|---|
| 5,015,878 A | 5/1991 | Lasagna | |
| 5,221,250 A | 6/1993 | Cheng | |
| 5,446,375 A | 8/1995 | Perkins | |
| 5,477,142 A | 12/1995 | Good | |
| 5,497,084 A * | 3/1996 | Bicking | G01D 5/2448 324/166 |
| 5,650,719 A | 7/1997 | Moody | |
| 6,064,199 A * | 5/2000 | Walter | G01B 7/003 123/406.58 |
| 6,191,576 B1 * | 2/2001 | Ricks et al. | 324/207.2 |
| 6,221,670 B1 | 4/2001 | Cordell | |
| 6,242,908 B1 | 6/2001 | Scheller | |
| 6,279,375 B1 | 8/2001 | Draxelmayr | |
| 6,487,787 B1 | 12/2002 | Nahum et al. | |
| 6,759,843 B2 * | 7/2004 | Furlong | G01D 5/145 324/207.2 |
| 6,822,597 B2 | 11/2004 | Draxelmayr | |
| 6,888,345 B2 | 5/2005 | Walter | |
| 6,967,477 B1 | 11/2005 | Murdock | |
| 7,231,325 B2 | 6/2007 | Motz | |
| 7,839,141 B2 * | 11/2010 | Werth | B82Y 25/00 324/207.21 |
| 2003/0231013 A1 | 12/2003 | Faymon et al. | |
| 2004/0095129 A1 * | 5/2004 | Furlong | G01D 5/145 324/207.2 |
| 2006/0071659 A1 | 4/2006 | Tatschl | |
| 2009/0295373 A1 | 12/2009 | Motz | |
| 2009/0326860 A1 | 12/2009 | Hainz | |
| 2010/0127700 A1 | 5/2010 | Sugiura | |
| 2011/0298447 A1 * | 12/2011 | Foletto | G01D 5/145 324/207.2 |
| 2011/0298450 A1 | 12/2011 | Foletto | |
| 2014/0019084 A1 * | 1/2014 | Rolew | G01D 5/145 702/150 |

FOREIGN PATENT DOCUMENTS

| | | |
|---|---|---|
| DE | 10223767 | 12/2003 |
| DE | 102011053565 | 3/2012 |
| FR | 2860587 | 4/2005 |
| FR | 2860587 A1 | 4/2005 |
| JP | 1999 337369 A | 11/1999 |
| WO | WO 87/06348 | 10/1987 |
| WO | WO 2004/079385 | 9/2004 |
| WO | WO2012089366 | 7/2012 |
| WO | WO2013017211 | 2/2013 |

OTHER PUBLICATIONS

Infineon Technologies AG, *TLE5027C E6747, GMR Based Crankshaft Sensor*, Datasheet Version 1.0, Sep. 2009, 33 pages.

Infineon Technologies AG, *Dynamic Differential Hall Effect Sensor IC: TLE 4921-3U*, 20 pages, dated Jul. 1, 2000.

Braun R.J., *Modular Hall Master Slice Transducer*, pp. 344-352, dated Sep. 17, 1974.

Baltes, Henry P., *Integrated Semiconductor Magnetic Field Sensors*, IEEE, 28 pages, © 1986.

Draxelmayr, Dieter, *A Self-Calibrating Hall Sensor IC with Direction Detection*, IEEE Journal of Solid-State Circuits, vol. 38, No. 7, Jul. 2003, pp. 1207-1212.

Allegro MicroSystems, Inc., *Self-Calibrating TPOS Gear Tooth Sensor Optimized for Automotive Cam Sensing Applications AT5673 and ATS67*, www.allegromirco.com, 21 pages, © 2005.

Motz, Mario, *A Chopped Hall Sensor with Small Jitter and Programmable "True Power-On" Function*, IEEE, vol. 40, No. 7, Jul. 2005, pp. 1533-1540.

Infineon Technologies AG, *Programmable True Power on Sensor Preliminary Data Sheet, Version 6.0*, TLE4980C, 25 pages, as available at www.datasheetcatalog.com on Jul. 3, 2012.

Infineon Technologies AG, TLE4984C Programmable Mono-cell Chopped Hall Sensor with True Power on for Cam Shaft Applications, 2 pages, dated Mar. 2012.

International Search Report for International Application No. PCT/EP2013/058558 mailed Aug. 6, 2013.

International Search Report dated Aug. 28, 2013 for International Application No. PCT/EP2013/058558.

Office Action dated Jan. 11, 2016 for Chinese Patent Application No. 201380024086.5 (with English translation).

Office Action dated Jun. 19, 2016 for Korean patent Application No. 2014-7031204 (with English translation).

\* cited by examiner

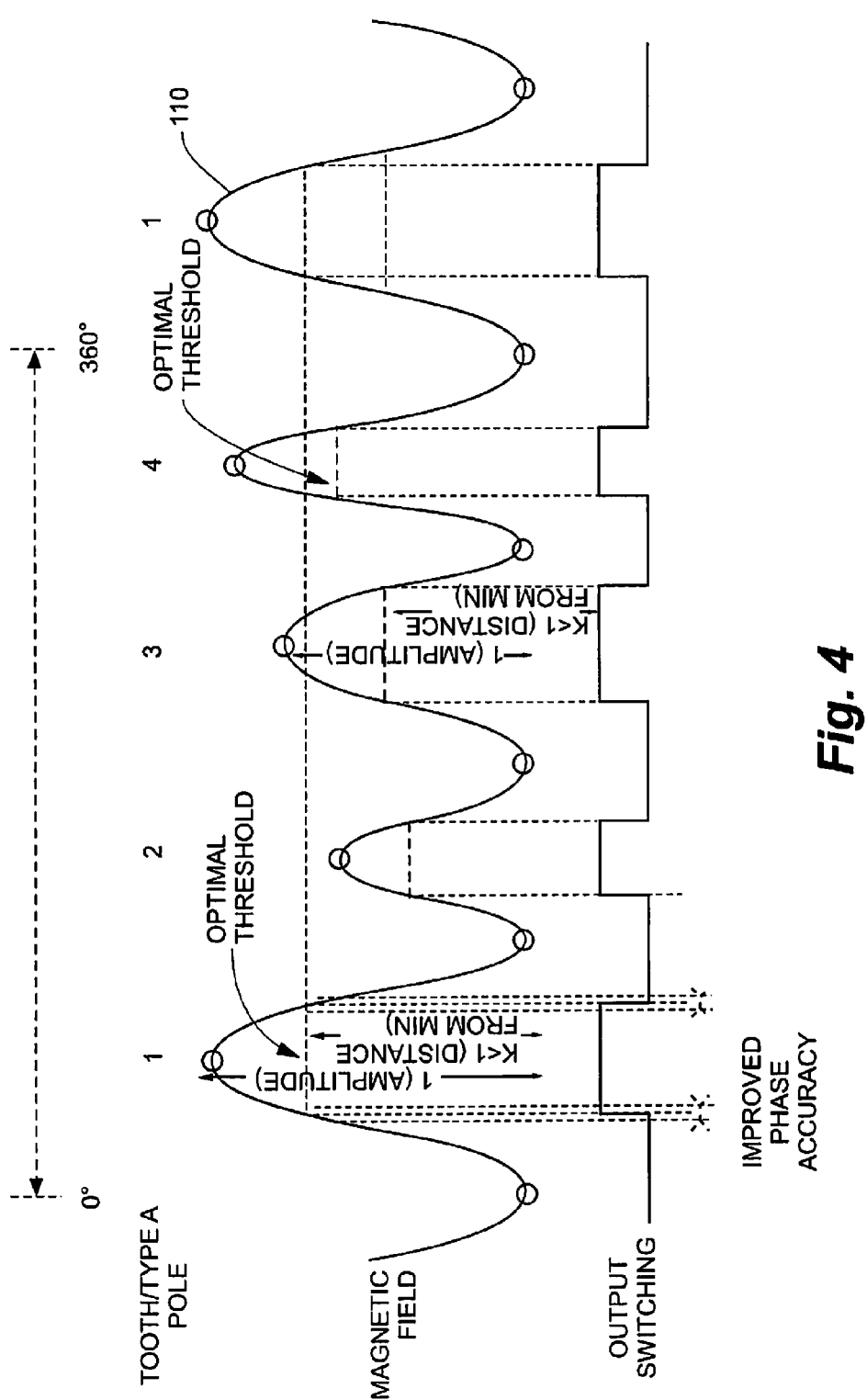

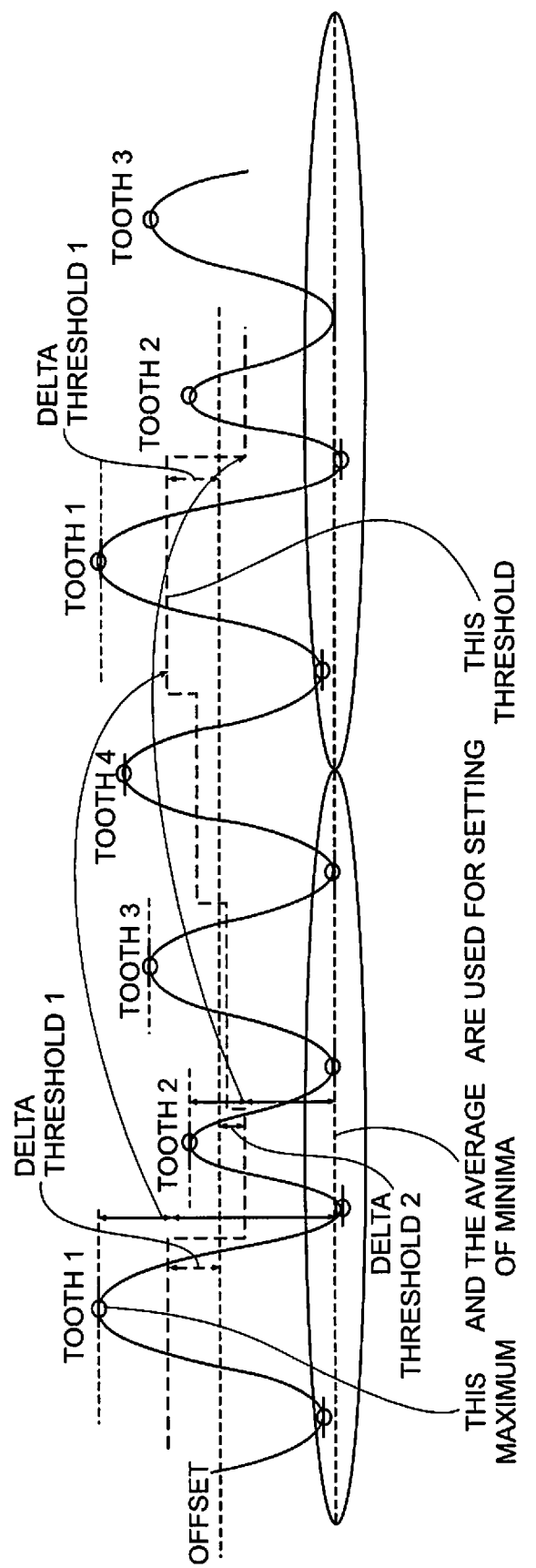

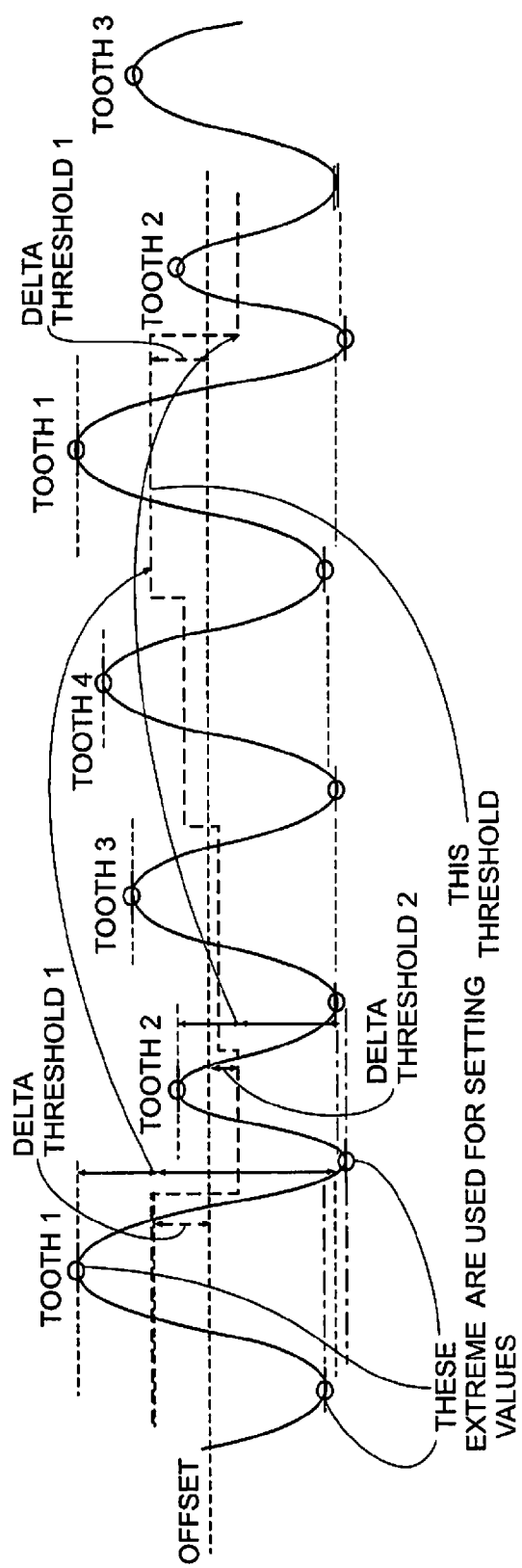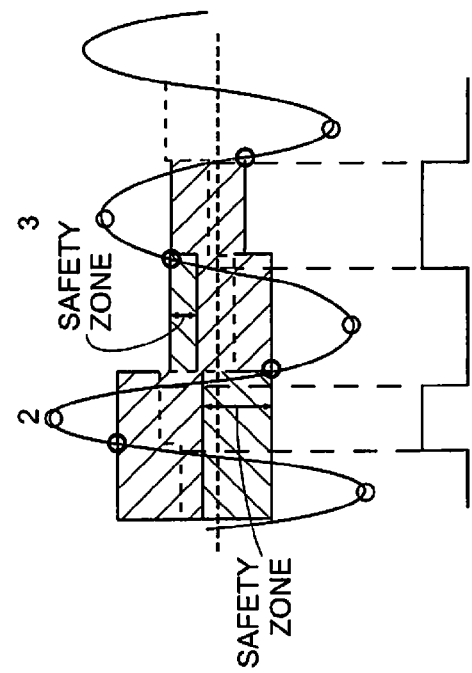

OUTPUT SWITCHING SYSTEMS AND METHODS FOR MAGNETIC FIELD SENSORS

RELATED APPLICATION

This application claims priority to U.S. Provisional Patent Application No. 61/643,677 filed May 7, 2012, which is incorporated herein by reference in its entirety.

TECHNICAL FIELD

The invention relates generally to sensors and more particularly to output switching systems and methods for magnetic sensors.

BACKGROUND

Magnetic field sensors have many applications, one of which is automobile engine management applications. For example, magnetic field sensors associated with rotating tooth or pole wheels and a back bias magnet can be used to sense rotation and/or positioning of the camshaft.

To reduce engine emissions, more accurate control of the engine is desired. This can be provided, at least in part, by better-performing, more accurate sensors, such as those which provide improved output switching and are less dependent on the relative positioning of the sensor and the rotating element, as the sensor signal depends on both the strength of the magnetic field and the distance between the sensor and the target element.

Conventional solutions for determining output switching thresholds typically are reactive, based on a slow regulation as a reaction to current signal characteristics. One of two approaches generally is taken: to set a single threshold over the entire pattern with slow adaptation after an overall pattern change (slow reactive algorithm), as shown in FIG. 1A; or to continuously adapt according to the last pair of a signal maximum and a signal minimum (fast reactive algorithm), as shown in FIG. 1B. While these approaches can improve phase repeatability and run-out (i.e., wobble of a tooth or pole wheel not centered on an axis), and robustness (amplitude modulation), respectively, they offer sub-optimal phase accuracy. Moreover, and referring to FIG. 2, a conceptual diagram of a conventional sensor signal processing system, which can be used for the camshaft example mentioned above, is depicted. The point where the output changes state is defined by the amount of feedback signal provided by the offset regulation loop. The slow loop response, determined by an anti-aliasing filter present in the forward signal path (analog signal processing block), constrains the amount and the timing of the updates in the offset regulation loop to preferably rare small updates. This slow response can lead to parasitic switching, which is undesired.

Therefore, a need exists for improved output switching systems and methods.

SUMMARY

Embodiments relate to optimal switching threshold determination systems and methods, such as for sensors.

In an embodiment, a sensor system comprises a target wheel comprising a plurality of target elements; and a sensor comprising a sensor element coupled to sensor circuitry, the sensor element configured to sense rotation of the target wheel and provide an output signal comprising a maximum and a minimum for each of the plurality of target elements, the sensor circuitry configured to use at least one maximum and at least one minimum related to one of the plurality of target elements to predict an optimal switching threshold for a future instance of that one of the plurality of target elements.

In an embodiment, a method comprises detecting, by a sensor element, a maximum and a minimum for each target element during a first rotation of a target wheel; and using at least one maximum and at least one minimum related to a particular target element to predict an optimal switching threshold for that target element in at least one subsequent rotation of the target wheel.

In an embodiment, a sensor comprises a sensor element configured to provide an input signal; and sensor circuitry coupled to the sensor element to receive the input signal, the sensor circuitry comprising a comparator configured to compare a portion of the input signal with an optimal switching threshold predicted for the portion of the input signal and to switch an output of the sensor circuitry depending upon the comparison.

BRIEF DESCRIPTION OF THE DRAWINGS

The invention may be more completely understood in consideration of the following detailed description of various embodiments of the invention in connection with the accompanying drawings, in which:

FIG. 4 is a signal diagram of a predictive optimal switching threshold determination system and method according to an embodiment.

FIG. 5A is a signal diagram of a predictive optimal switching threshold determination system and method according to an embodiment.

FIG. 5B is a signal diagram of a predictive optimal switching threshold determination system and method according to an embodiment.

FIG. 5C is a signal diagram of a predictive optimal switching threshold determination system and method according to an embodiment.

Figure 1A:
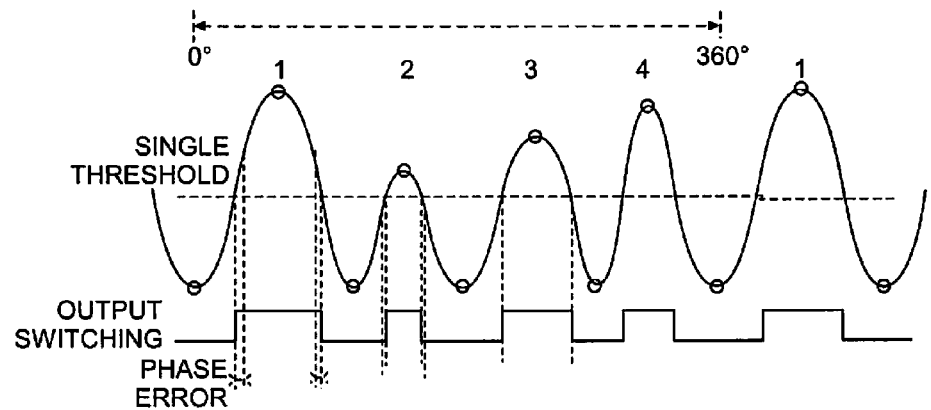
FIG. 1A is a signal diagram related to a conventional single threshold embodiment.
Figure 1B:
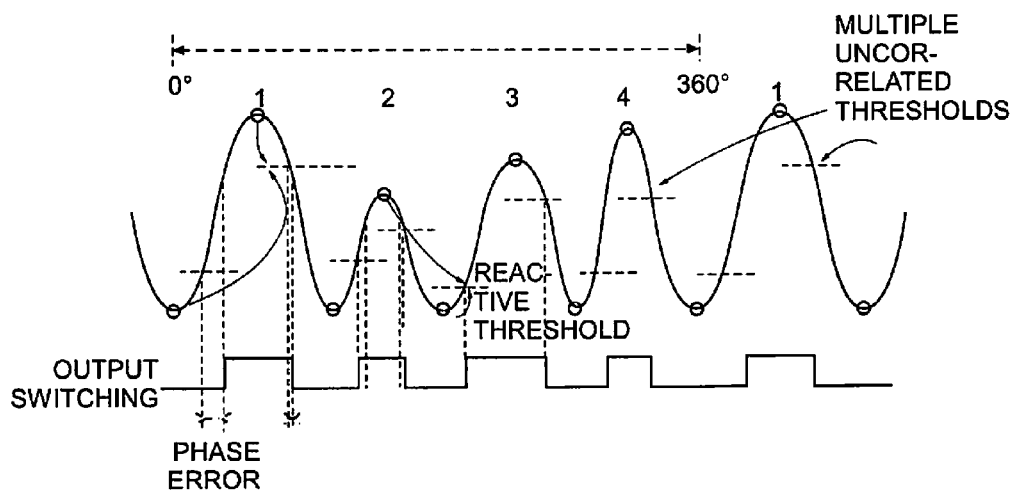
FIG. 1B is a signal diagram related to a conventional reactive threshold embodiment.
Figure 2:
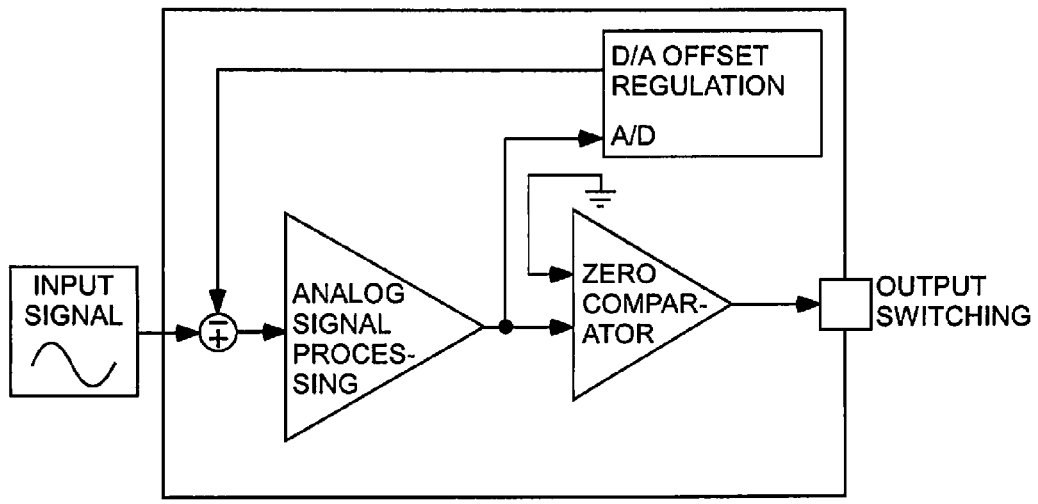
FIG. 2 is a circuit block diagram related to conventional threshold determination circuitry.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to predictive output switching threshold determination systems and methods for sensors, for example magnetic field sensors. In embodiments, at least one individual switching threshold is determined predictively, rather than reactively, for each tooth or pole of a ferromagnetic tooth or pole wheel, respectively. For example, in one embodiment, the number of teeth or poles is programmed, and an optimal threshold for each tooth or pole is determined during a rotation of the wheel. The determined optimal threshold for each tooth is then used for that tooth in at least one subsequent rotation of the wheel, with calibration optionally taking place in future subsequent rotations. Thus, in embodiments, thresholds are predictive for each individual tooth or pole rather than reactive to an adjacent tooth or pole.

Embodiments thereby can provide improved phase accuracy while also better calibrating and/or compensating for run-out, manufacturing and positioning tolerances between the sensor and the target wheel. These and other embodiments also provide additional benefits and advantages as discussed herein.

Figure 3:
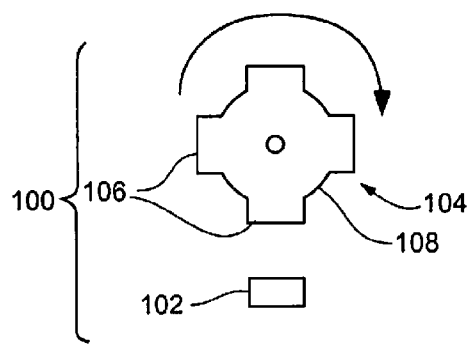
FIG. 3 is a block diagram of a target wheel and sensor system according to an embodiment.

Referring to FIG. 3, a sensor system 100 comprising a sensor 102 spaced apart from a target wheel 104 is depicted. In embodiments, sensor 102 comprises a magnetic field sensor, such as a Hall effect sensor, though sensor 102 can comprise other sensor types in embodiments. Sensor 102 also comprises signal processing circuitry, discussed herein below.

In embodiments in which sensor 102 comprises a magnetic field sensor, target wheel 104 is ferromagnetic and comprises a tooth wheel (as depicted in FIG. 3), a pole wheel or some other suitable target device. Sensor system 100 also can comprise a back bias magnet (not depicted). In embodiments in which some other type of sensor 102 is used, target wheel comprises some other suitable target, rotation or movement of which can be detected by sensor 102. In the embodiment depicted in FIG. 3, target wheel 104 comprises four teeth 106, but this number can be higher or lower in other embodiments. For convenience, a four-tooth wheel as depicted in FIG. 3 will be used herein throughout as an example target wheel 104 but is in no way to be considered limiting with respect to other embodiments. In embodiments, the number of teeth or poles can be programmed into memory, such as EEPROM, of sensor system 100, or the number of teeth can be detected by sensor system 100.

Each tooth 106 of target wheel 104 is depicted for convenience in FIG. 3 as being approximately equal in size, i.e., having about the same width and same height relative to the valleys 108 or remainder of target wheel 104. In practice, teeth 106 can vary from one another intentionally or unintentionally. For example, teeth 106 can vary from one another intentionally, such that sensor system 100 can more easily determine exactly where in rotation target wheel 104 is. Teeth 106 also can vary from one another unintentionally, for example because of manufacturing tolerances or defects.

In operation, target wheel 104 rotates, creating a varying magnetic field that can be sensed by sensor 102. Referring to FIG. 4, a signal sensed by sensor 102 can resemble signal 110. The portion of signal 110 related to each of Teeth 1-4 is identified above signal 110. Signal 110 as depicted indicates differences between the four teeth (not depicted in FIG. 3) such that the relative maximum strength and phase of the magnetic field varies during rotation. The minimum strength is relatively constant, though this also can vary in other embodiments. Sensor system 100 therefore switches from high to low, or on to off, as target wheel 104 rotates and the magnetic field detected by sensor 102 varies from high to low.

For improved phase accuracy, it is desired to switch from high to low, and vice-versa, at the same point geometrically for smaller and larger and teeth. For example, in one embodiment it is optimal to switch from low to high when the magnetic field reaches about 70% of the maxima of the particular tooth, i.e., when K=0.7 of the amplitude. Likewise, it can then be optimal to switch from high back to low when the magnetic field falls below 70% of the maxima of the field associated with that particular tooth. When the size of the tooth varies, K also can vary from tooth to tooth, as illustrated by the example optimal thresholds depicted in FIG. 4.

While a value for K can be programmed for sensor system 100, it is impractical if not impossible to program a corresponding optimal threshold associated with that K for each individual tooth of each target wheel 104 of each implementation of sensor system 100. Moreover, the optimal threshold can vary because of run-out, temperature changes, positioning and for many other reasons.

Therefore, in embodiments, sensor system 100 determines an optimal threshold for each tooth during at least one rotation of target wheel 104. The at least one rotation can be the first rotation of target wheel 104, a preceding rotation of target wheel 104 or a current rotation of target wheel 104, or some combination thereof, in embodiments. Moreover, embodiments of sensor system 100 use the determined optimal thresholds predictively, applying the thresholds for future instances of the same tooth in subsequent rotations. To account for events that can occur during operation after the optimal thresholds have initially been determined, such as temperature changes or other events that could alter the positioning of one or both of sensor 102 and target wheel 104, optimal thresholds can continue to be predictively determined in future rotations to provide calibration. In embodiments, optimal thresholds can be redetermined, or calibrated, each rotation or at some other interval, while in other embodiments the optimal thresholds can be determined once and used on an ongoing basis. Regardless of whether calibration is implemented, the determined optimal switching thresholds are used predictively, i.e., they are determined during a first rotation of target wheel 104 for each tooth and applied in at least one subsequent rotation for future instances of that same tooth.

Referring to FIG. 5A, one method of determining an optimal switching threshold is depicted. In the embodiment of FIG. 5A, sensor system 100 uses the maximum value during a first rotation of Tooth 1 and an average of the minimum of each of Teeth 1-4 in that first rotation, along with a programmed or dynamically determined K-value, to predictively determine the optimal threshold for the next instance of Tooth 1 in a subsequent. Likewise, sensor system 100 uses the maximum of the first instance of Tooth 2 and an average of the minima of the first instances of Teeth 1-4 to predictively determine the optimal threshold for the second instance of Tooth 2. A similar methodology can be extended to determine the optimal switching thresholds of each of the second instances of Teeth 3 and 4.

Referring to FIG. 5B, another methodology is depicted, in which the maximum and two adjacent minima of a tooth are used to predict the optimal switching threshold of the next instance of that tooth. For example, the maximum of the first instance of Tooth 1 as well as the minimum immediately preceding the maximum and the minimum immediately following the maximum, along with the programmed K-value, are used to predict the optimal switching threshold of the second instance of Tooth 1. This same approach can be extended for the other teeth.

The embodiments of FIGS. 5A and 5B each can provide embodiments that, respectively, can be more suited for one application or another. For example, FIG. 5B can have a lower memory requirement in embodiments because all four minima need not be stored in order to determine the average, and while this can be advantageous in some applications it may not be a decisive factor in others. Fundamentally, various embodiments provide a range of options which can be considered for any particular application.

In embodiments, the minimum/maximum opposites of each of FIGS. 5A and 5B can be used. For example, referring to the method of FIG. 5A, an individual minimum and an average of the maxima can be used, or, referring to FIG. 5B, an individual minimum and two adjacent maxima can be used. Additionally, the particular methodology need not be singular; for example, in embodiments sensor system 100 can alternate between the approach of FIG. 5A and the approach of FIG. 5B, or between other methodologies as discussed. In embodiments, sensor system 100 can be programmed with both methodologies as well as the capability of dynamically deciding which would be most appropriate given the application and/or conditions.

Referring to FIG. 5C, in other embodiments different optimal switching thresholds can be determined not just for each tooth or pole but also for each edge, e.g., different optimal switching thresholds for rising versus falling edges of the same tooth or pole. Thus, in the embodiment of FIG. 3 in which target wheel 104 comprises four teeth 106, sensor system 100 would calculate eight optimal switching thresholds, two for each tooth 106.

Figure 6:
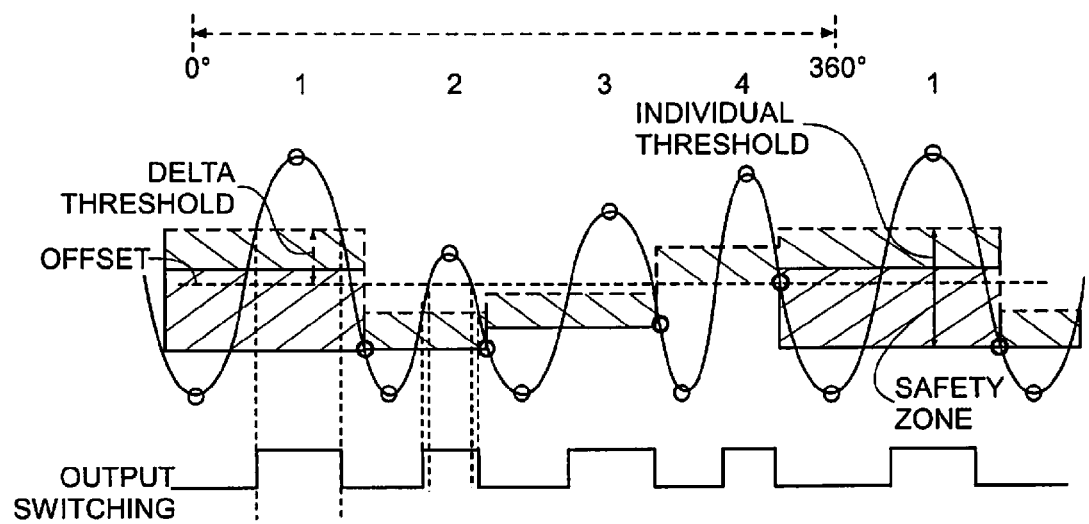
FIG. 6 is a signal diagram of a predictive optimal switching threshold determination system and method according to an embodiment.

Referring to FIG. 6, the timing of switching from one optimal threshold to the next optimal threshold for the following tooth also must be considered. The difference between the optimal threshold and the amount of feedback provided to the offset regulation loop is depicted as the delta threshold. The process, including the timing, of switching from a current optimal threshold to the next optimal threshold is optimally triggered in embodiments to avoid parasitic switching or switching to the wrong threshold. This optimal triggering also can consider hysteresis effects within sensor system 100. Therefore, as depicted in FIG. 6, safety zones can be implemented in embodiments to prevent premature switching. In one embodiment, the point at which the next threshold is passed on the falling edge plus a hysteresis factor defines each safety zone, with safety zones extended for both the rising and falling edges.

Hysteresis can be addressed in several ways. In embodiments, a hysteresis factor can be fixed. For example, a hysteresis factor can be programmed in sensor system 100 based on a known application or situation in which system 100 will be implemented. An example hysteresis value in one embodiment is about 3 mT, though this can vary in other embodiments. In other embodiments, the hysteresis factor can adapt to signal amplitude. In these embodiments, sensor system 100 can be programmed to calculate a hysteresis factor internally using the same information as for calculating the optimal thresholds given that hysteresis is proportional to the signal amplitude. For example, in the first rotation in which the optimal thresholds are determined, sensor system 100 can use the maxima and minima to determine the amplitude and therefore an appropriate hysteresis factor. As depicted in FIG. 6, switching points 120 then can be identified, at which sensor system 100 can switch the optimal threshold to be used.

For the embodiment of FIG. 5C in which each tooth or pole has two optimal thresholds, one for the rising edge and another for the falling edge, sensor system 100 can continuously calculate the safety zone based on the stored maximum and minimum corresponding to a particular rising or falling edge. For the change between two consecutive thresholds to occur, an equivalent safety zone, which also considers hysteresis, above the thresholds can be implemented.

Figure 7:
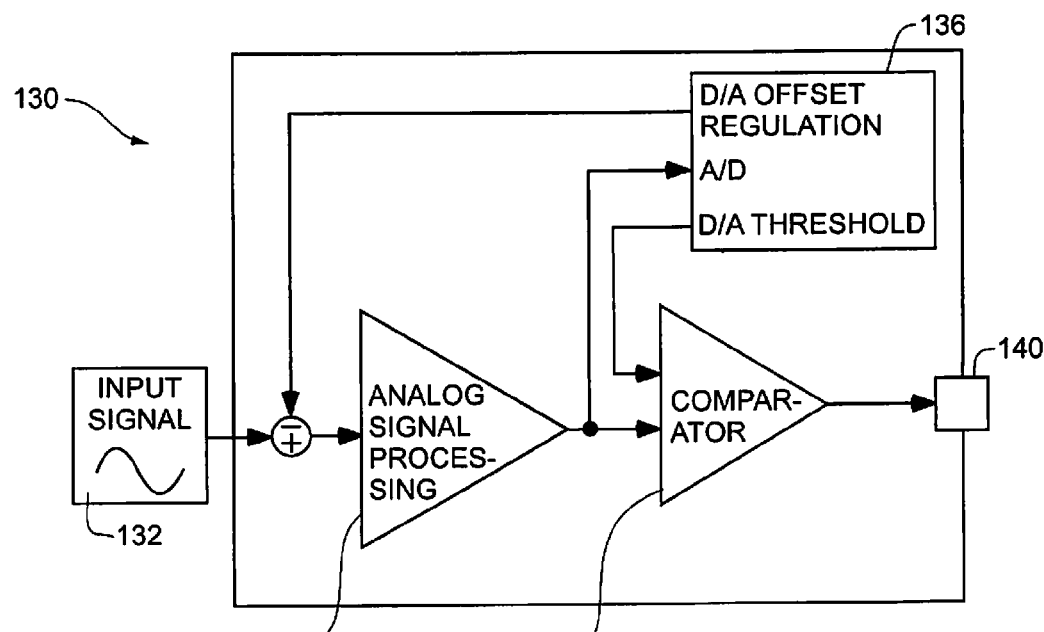
FIG. 7 is a circuit block diagram according to an embodiment.

Referring to FIG. 7, an embodiment of circuitry 130 of sensor system 100 is depicted. Circuitry 130 receives an analog input signal 132 from the sensor element, such as a Hall element as previously discussed. The signal is passed through an analog signal processing block 134 and then, in an analog loop, to an analog-to-digital converter (ADC) and digital-to-analog converter (DCA) 136 for offset regulation and determination of the optimal threshold(s). After analog signal processing 134, the signal is also passed to a converter 138 where it is compared with the appropriate predictive optimal threshold determined from the last instance of the tooth or pole related to the particular input signal 132 being considered to determine whether output switching 140 is to take place.

Figure 8A:
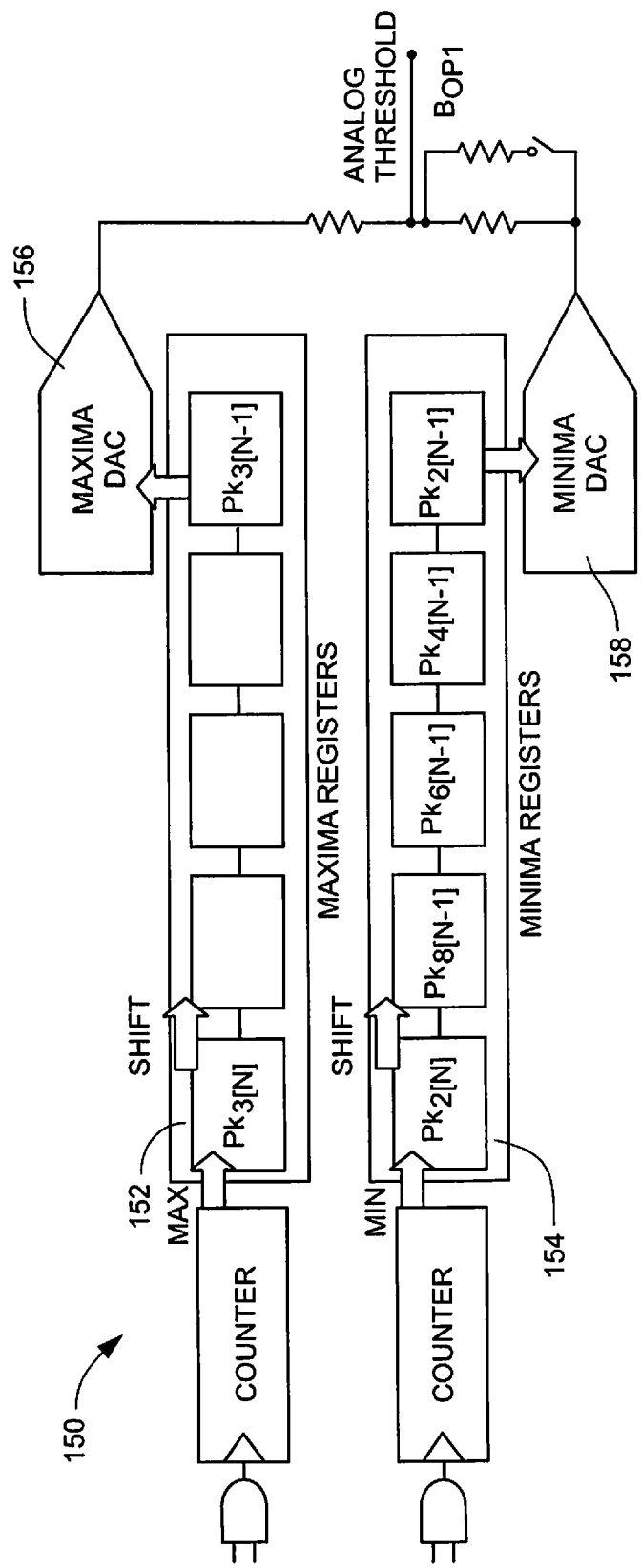
FIG. 8A is a circuit block diagram according to an embodiment.
Figure 8B:
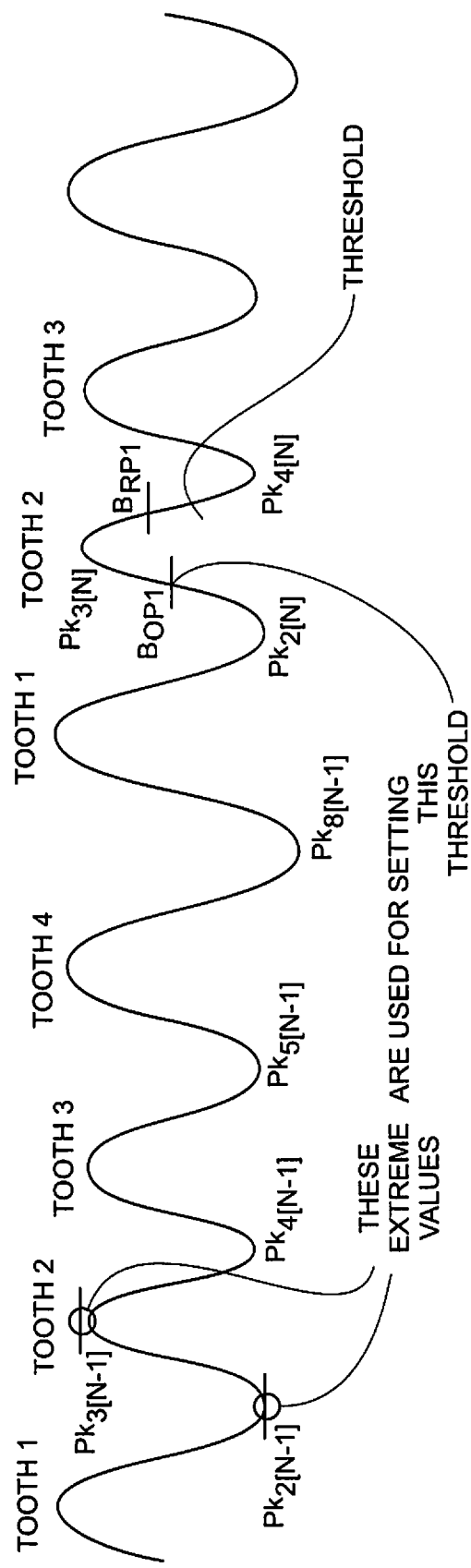
FIG. 8B is a signal diagram of a predictive optimal switching threshold determination system and method according to the embodiment of FIG. 8A.

Referring to FIG. 8, another embodiment of circuitry 150 and a related signal diagram for implementing embodiments of the invention are depicted. Referring to FIG. 8A, circuitry 150 comprises two series of shift registers 152 and 154, one each for the maxima and the minima. Circuitry 150 comprises a shift register in each series 152 and 154 for each tooth. Thus, the embodiment of FIG. 8A comprises four each, corresponding to the embodiment of FIG. 3.

Shift registers 152 and 154 buffer each maxima and minima and pass those values to the DACs 156 and 158 delayed by one rotation of the target wheel. Thus, referring to FIG. 8B, Bop1 is determined from Pk2 and Pk3; Brp1 is determined by Pk3 and Pk4, where Pk2, Pk3 and Pk4 are determined and stored one rotation period before.

Embodiments therefore utilize predictive optimal threshold determination in order to improve output signal switching performance. Various embodiments can utilize different signal factors, such as maxima, minima and/or averages of one or both, to predictively determine optimal thresholds associated with a particular portion (e.g., a tooth or pole) of a target wheel, with those optimal thresholds implemented for at least one future rotation of the target wheel. Compared with conventional single threshold and/or reactive systems, numerous advantages as discussed herein above can be provided.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art. Moreover, elements described with respect to one embodiment may be implemented in other embodiments even when not described in such embodiments unless otherwise noted. Although a dependent claim may refer in the claims to a specific combination with one or more other claims, other embodiments may also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A sensor system comprising:
   a target wheel comprising a plurality of target elements; and
   a sensor comprising a magnetic field sensor element coupled to sensor circuitry, the magnetic field sensor element configured to sense rotation of the target wheel based on a varying magnetic field and provide a corresponding output signal comprising a maximum and a minimum for each of the plurality of target elements indicating any differences between the plurality of target elements, the sensor circuitry configured to, for each one of the plurality of target elements, use at least one maximum and at least one minimum related to the one of the plurality of target elements to predict an individual switching threshold for a subsequent instance of that one of the plurality of target elements, wherein the sensor circuitry is configured to use the maximum for the one of the plurality of target elements and a value determined from the minima for the plurality of target elements in at least one rotation to predict the individual switching threshold for at least the next instance of that one of the plurality of target elements.

2. The sensor system of claim 1, wherein the target wheel comprises one of a pole wheel or a tooth wheel and the target elements comprise one of poles or teeth, respectively.

3. The sensor system of claim 1, wherein the magnetic field sensor element comprises a Hall element.

4. The sensor system of claim 1, further comprising a back bias magnet.

5. The sensor system of claim 1, wherein the sensor circuitry is configured to, for each one of the plurality of target elements, predict a rising edge individual threshold and a falling edge individual threshold for a subsequent instance of that one of the plurality of target dements.

6. The sensor system of claim 1, wherein the sensor circuitry is further configured to, for each one of the plurality of target elements, use the maximum for the one of the plurality of target elements, a minimum immediately preceding the maximum and a minimum immediately following the maximum to predict the individual switching threshold for at least the next instance of that one of the plurality of target elements.

7. The sensor system of claim 1, wherein the sensor circuitry is further configured to, for each one of the plurality of target elements, use the minimum for the one of the plurality of target elements and an average of the maxima for the plurality of target elements in one rotation to predict the individual switching threshold for at least the next instance of that one of the plurality of target elements.

8. The sensor system of claim 1, wherein the sensor circuitry is further configured to, for each one of the plurality of target elements, use the minimum for the one of the plurality of target elements, a maximum immediately preceding the minimum and a maximum immediately following the minimum to predict the individual switching threshold for at least the next instance of that one of the plurality of target elements.

9. The sensor system of claim 1, wherein the sensor circuitry is further configured to determine a safety zone for each individual threshold, the safety zone defining a point at which the sensor circuitry can transition from comparing the output signal with a current individual threshold to comparing the output signal with a subsequent individual threshold.

10. The sensor system of claim 9, wherein the safety zone comprises a hysteresis compensation component.

11. The sensor system of claim 10, wherein the hysteresis compensation component is preprogrammed.

12. The sensor system of claim 10, wherein the hysteresis compensation component is determined by the sensor circuitry from a signal amplitude.

13. The sensor system of claim 1, wherein the sensor circuitry comprises analog signal processing circuitry, a comparator, a digital-to-analog converter and an analog-to-digital converter.

14. The sensor system of claim 13, wherein the comparator is configured to compare the output signal from the magnetic field sensor element with an individual switching threshold.

15. The sensor system of claim 1, wherein the sensor circuitry comprises, for each one of the plurality of target elements, a plurality of shift registers, a first subset of the plurality of shift registers each configured to store a maximum for one of the target elements, and a second subset of the plurality of shift registers each configured to store a minimum for one of the target elements, the plurality of shift registers configured to buffer the maxima and minima until a next instance of the target element associated with a particular set of a maximum and a minimum.

16. The sensor system of claim 1, wherein the sensor circuitry is configured to detect a total number of the plurality of target elements.

17. The sensor system of claim 1, wherein the sensor circuitry is preprogrammed with a total number of the plurality of target elements.

18. A method comprising:
   detecting, by a magnetic field sensor element, a maximum and a minimum for each target element, indicating any differences between each target element, during a first rotation of a target wheel;
   using, for each of the plurality of target elements, at least one maximum and at least one minimum related to the particular target element to predict an individual switching threshold for the particular target element in at least one subsequent rotation of the target wheel; and using the maximum for the one of the plurality of target elements and a value determined from the minima for the plurality of target elements in at least one rotation to predict the individual switching threshold for at least the next instance of that one of the plurality of target elements.

19. The method of claim 18, comprising calibrating the individual switching threshold by repeating the detecting and using in each rotation of the target wheel.

20. The method of claim 18, further comprising using comprises using a maximum for the particular target element, a minimum immediately preceding the maximum and minimum immediately following the maximum to predict the individual switching threshold for at least the next instance of the particular target element.

21. The method of claim 18, further comprising using comprises using a minimum for the particular target element, a maximum immediately preceding the minimum and a maximum immediately following the minimum to predict the individual switching threshold for at least the next instance of the particular target element.

22. The method of claim 18, further comprising using comprises using a maximum for the particular target element and an average of the minima from at least one of the first rotation, a preceding rotation or a current rotation to predict the individual switching threshold for at least the next instance of the particular target element.

23. The method of claim 18, further comprising using comprises using a minimum for the particular target element and an average of the maxima from at least one of the first rotation, a preceding rotation or a current rotation to predict the individual switching threshold for at least the next instance of the particular target element.

24. The method of claim 18, further comprising determining a safety zone for the individual switching threshold, the safety zone defining a point to switch from an individual switching threshold for a first target element to an individual switching threshold for a next target element.

25. The method of claim 24, wherein determining a safety zone comprises including a hysteresis factor.

26. The method of claim 25, wherein including a hysteresis factor comprises using a preprogrammed hysteresis factor.

27. The method of claim 25, wherein including a hysteresis factor comprises dynamically determining a hysteresis factor from a maximum and a minimum for a target element.

28. A sensor comprising;
a magnetic field sensor element configured to provide an input signal indicating differences between different portions of the input signal; and
sensor circuitry coupled to the magnetic field sensor element to receive the input signal, the sensor circuitry comprising a comparator configured to, for each one of a plurality of portions of the input signal, compare the portion of the input signal with an individual switching threshold predicted for the respective portion of the input signal and to switch an output of the sensor circuitry depending upon the comparison,
wherein the sensor circuitry is configured to use the maximum for the one of the plurality of portions of the input signal and a value determined from the minima for the plurality of portions of the input signal in at least one rotation to predict the individual switching threshold for at least the next instance of that one of the plurality of portions of the input signal.

29. The sensor of claim 28, wherein the magnetic field sensor element comprises a Hall effect element.

30. The sensor of claim 28, wherein the sensor circuitry comprises analog signal processing circuitry coupled between the magnetic field sensor element and the comparator.

31. The sensor system of claim 1, wherein the individual switching threshold is an optimal switching threshold for that one of the plurality of target elements, and is defined as 70% of the at least one maximum of that one of the plurality of target elements.

32. The method of claim 18, wherein the individual switching threshold is an optimal switching threshold for that target element, and is defined as 70% of the at least one maximum of that target element.

33. The sensor of claim 28, wherein the individual switching threshold is an optimal switching threshold for the portion of the input signal, and is defined as 70% of a maximum of the portion of the input signal.

* * * * *